US011256953B2

(12) United States Patent
Yamamoto et al.

(10) Patent No.: US 11,256,953 B2
(45) Date of Patent: Feb. 22, 2022

(54) IMAGE IDENTIFICATION APPARATUS, IMAGE IDENTIFICATION METHOD, TRAINING APPARATUS, AND NEURAL NETWORK HAVING SUB-NEURAL NETWORKS RESPECTIVELY INPUTTED WITH MUTUALLY DIFFERENT DATA (71) Applicant: CANON KABUSHIKI KAISHA, Tokyo (JP)

(72) Inventors: Takahisa Yamamoto, Kawasaki (JP); Hiroshi Sato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 189 days.

(21) Appl. No.: 16/535,289

(22) Filed: Aug. 8, 2019

(65) Prior Publication Data
US 2020/0057916 A1 Feb. 20, 2020

(30) Foreign Application Priority Data

Aug. 20, 2018 (JP) .............................. JP2018-154214

(51) Int. Cl.
*G06K 9/62* (2006.01)
*G06N 3/08* (2006.01)
*G06K 9/00* (2022.01)

(52) U.S. Cl.
CPC ....... *G06K 9/6229* (2013.01); *G06K 9/00268* (2013.01); *G06K 9/6256* (2013.01); *G06N 3/08* (2013.01)

(58) Field of Classification Search
None
See application file for complete search history.

(56) References Cited

U.S. PATENT DOCUMENTS

| 9,530,047 | B1 * | 12/2016 | Tang ..................... G06K 9/4652 |
| 10,387,773 | B2 * | 8/2019 | Yan .......................... G06N 3/04 |
| 10,699,102 | B2 * | 6/2020 | Nakano ..................... G06K 9/66 |
| 2016/0117587 | A1 * | 4/2016 | Yan ....................... G06N 3/0454 706/20 |
| 2016/0358628 | A1 * | 12/2016 | Liu ..................... G06K 9/00765 |
| 2017/0011264 | A1 * | 1/2017 | Smolic ................... G11B 27/28 |

(Continued)

OTHER PUBLICATIONS

Sun et al. "Deep Learning Face Representation by Joint Identification-Verification." In Procs. NIPS. 2014. Cited in the specification.

(Continued)

*Primary Examiner* — Tahmina N Ansari
(74) *Attorney, Agent, or Firm* — Rossi, Kimms & McDowell LLP (57) ABSTRACT There is provided with an image identification apparatus. An extraction unit extracts a feature value of an image from image data using a Neural Network (NN). A processing unit identifies the image based on the feature value extracted by the extraction unit. The NN comprises a plurality of calculation layers connected hierarchically. The NN includes a plurality of sub-neural networks for performing processing of calculation layers after a specific calculation layer. Mutually different data from an output of the specific calculation layer are respectively inputted to the plurality of sub-neural networks.

20 Claims, 8 Drawing Sheets (56) References Cited

U.S. PATENT DOCUMENTS

| | | | | |
|---|---|---|---|---|
| 2018/0025079 A1* | 1/2018 | Xiao | ............... | G06F 16/739 |
| | | | | 707/722 |
| 2019/0122035 A1* | 4/2019 | Wang | ............... | G06K 9/469 |
| 2019/0314984 A1* | 10/2019 | Gonzalez Aguirre | ... | B25J 9/161 |
| 2020/0394414 A1* | 12/2020 | Shi | ............... | G06K 9/00744 |

OTHER PUBLICATIONS

Viola et al. "Rapid Object Detection using a Boosted Cascade of Simple Features." Proceedings of the 2001 IEEE Computer Society Conference on Computer Vision and Pattern Recognition. 2001. Cited in the specification.

* cited by examiner

IMAGE IDENTIFICATION APPARATUS, IMAGE IDENTIFICATION METHOD, TRAINING APPARATUS, AND NEURAL NETWORK HAVING SUB-NEURAL NETWORKS RESPECTIVELY INPUTTED WITH MUTUALLY DIFFERENT DATA

BACKGROUND OF THE INVENTION

Field of the Invention

The present invention relates to an image identification apparatus, an image identification method, a training apparatus, a convolutional neural network, and for example, a technique for performing, on image data, an image recognition process for faces, objects, or the like.

Description of the Related Art

A multi-layer neural network called a deep neural network (also called a deep neural net or deep learning, hereinafter called a deep net) has received great attention in recent years. A deep net generally refers to something that performs hierarchical processing (a processing result of a certain layer is used as an input of processing of a subsequent layer) in relation to input data (e.g., an image). As a deep net, a hierarchical convolutional neural network (CNN) is well known, and this has a configuration that includes a convolution layer for performing convolution filter calculations and a fully-connected layer for performing fully-connected calculations. In particular, in the field of image identification, deep nets are becoming a mainstream technique. In recent years, there has been proposed a technique for improving the accuracy of image recognition by preparing a plurality of such deep nets and combining the outputs of respective deep nets (Y. Sun, Y. Chen, X. Wang, and X. Tang. "Deep learning face representation by joint identification-verification." In Proc. NIPS, 2014, hereinafter referred to as "Sun").

SUMMARY OF THE INVENTION

According to an embodiment of the present invention, an image identification apparatus comprises: an extraction unit configured to extract a feature value of an image from image data using a Neural Network (NN); and a processing unit configured to identify the image based on the feature value extracted by the extraction unit, wherein the NN comprises a plurality of calculation layers connected hierarchically, and wherein the NN includes a plurality of sub-neural networks for performing processing of calculation layers after a specific calculation layer, and wherein mutually different data from an output of the specific calculation layer are respectively inputted to the plurality of sub-neural networks.

According to another embodiment of the present invention, an image identification method comprises: extracting a feature value of an image from image data using a Neural Network (NN); and identifying the image based on the feature value extracted by the extraction unit, wherein the NN comprises a plurality of calculation layers connected hierarchically, and wherein the NN includes a plurality of sub-neural networks for performing processing of calculation layers after a specific calculation layer, and wherein mutually different data from an output of the specific calculation layer are respectively inputted to the plurality of sub-neural networks.

According to still another embodiment of the present invention, a training apparatus comprises: a training unit configured to train a Neural Network (NN), wherein the NN comprises a plurality of calculation layers connected hierarchically, wherein the NN includes a plurality of sub-neural networks for performing processing of calculation layers after a specific calculation layer, and wherein mutually different data from an output of the specific calculation layer are respectively inputted to the plurality of sub-neural networks, and wherein the training unit is further configured to determine parameters of the NN by performing training so as to reduce a cost calculated based on an output from each of the plurality of sub-neural networks.

According to yet another embodiment of the present invention, a neural network (NN) comprises a plurality of calculation layers connected hierarchically, wherein the NN includes a plurality of sub-neural networks for performing processing of calculation layers after a specific calculation layer, and wherein mutually different data from an output of the specific calculation layer are respectively inputted to the plurality of sub-neural networks.

Further features of the present invention will become apparent from the following description of exemplary embodiments (with reference to the attached drawings).

DESCRIPTION OF THE EMBODIMENTS

In Sun, cut-out images are extracted from each different region of a face image, and the cut-out images are input to different deep nets. In this configuration, since the same number of deep nets as the number of cut-out images are used, calculation resources and processing time required for face authentication are increased. That is, when the number of cut-out images is M, M deep nets are required, and therefore, the required calculation resources and processing time are M times those when one deep net is used (when all M deep nets have the same network configuration).

An embodiment of the present invention enables extraction of feature values more suitable for identification of input data while suppressing an increase in required calculation resources or processing time.

According to an embodiment of the present invention, it is possible to realize a convolutional neural network capable of calculating a feature value that expresses the properties of an image to be processed well. In the case of using this convolutional neural network, even with a plurality of cut-out regions in the image to be processed, the calculation can be performed using fewer calculation resources or less processing time without the required calculation resources or processing time being proportional to the number of cut-out regions. A convolutional neural network according to an embodiment of the present invention is configured by hierarchically connecting a plurality of calculation layers, and is also referred to as a hierarchical convolutional neural network. Hereinafter, for simplicity of explanation, a convolutional neural network is referred to as a CNN.

A CNN according to an embodiment of the present invention has the following two parts. The first part is a neural network from an input layer to an intermediate output feature plane (can also be referred to as a division target feature plane, and is referred to below as a branching plane). The first part comprises a single CNN and is referred to hereinafter as a root neural network, abbreviated as a root network. The second part is the neural network after the branching plane. The second part comprises a plurality of sub-region neural networks (hereinafter referred to as sub-neural networks, or abbreviated as sub-networks). As described above, the CNN according to the embodiment of the present invention has a plurality of sub-neural networks for performing processing of a calculation layer in a layer after a specific layer (a layer for outputting a branching plane). Each of the plurality of sub-neural networks is inputted with mutually different data out of the output of the same calculation layer of the specific layer (that is, the branching plane). For example, each sub-network can perform a calculation using each of a plurality of sub-regions set on a branching plane as an input. Here, the respective sub-regions do not completely coincide with each other, but may partially overlap with each other.

By configuring the CNN as described above, it is possible to calculate a feature value that expresses well a property of the image to be processed, without the calculation resource or the processing time being proportional to the number of cut-out regions. Embodiments of the present invention will be described below based on the drawings. However, the scope of the present invention is not limited to the following embodiments. For example, data input to the CNN is not necessarily limited to image data.

First Embodiment

First, an example of the configuration of the CNN in the case where two sub-regions are set in the branching plane will be described below as an example of the case where the CNN is used for face authentication. However, an object to be authenticated is not limited to a face, and the CNN according to the present invention may be used for authentication of a human body or an object.

Figure 3:
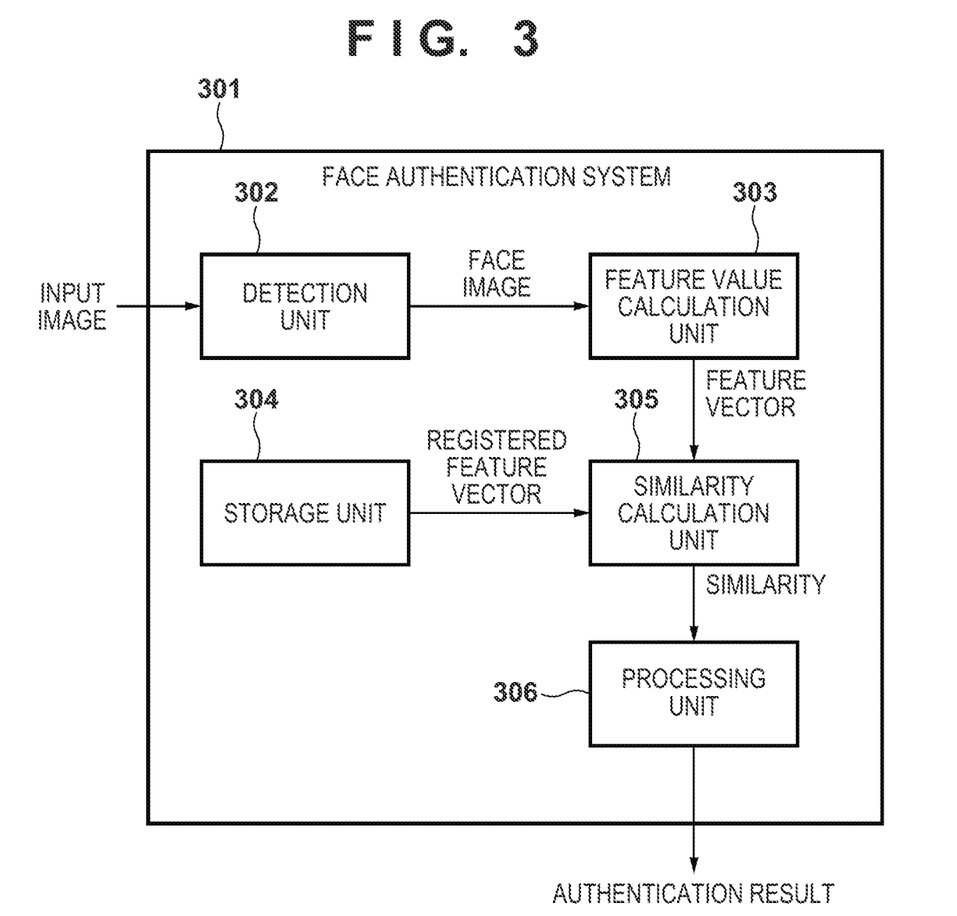
FIG. 3 is a block diagram illustrating an example of a functional configuration of a face authentication system according to an embodiment.

FIG. 3 illustrates a functional block diagram of a face authentication system which is an information processing system according to an embodiment of the present invention. Face authentication refers to a process for identifying a face image existing in an input image, and is a process for identifying, for example, an ID of the face image (an identifier for identifying an individual such as a name).

The face authentication system 301 acquires an input image, and outputs an ID of a face image in the input image. The face authentication system 301 includes a detection unit 302, a feature value calculation unit 303, a storage unit 304, a similarity calculation unit 305, and a processing unit 306.

The detection unit 302 performs face detection processing for extracting a face image that includes a face from an input image. The face detection processing is performed by a known technique, and the technique described in, for example, "Rapid Object Detection using a Boosted Cascade of Simple Features", Paul Viola, Michael Jones, Proceedings of the 2001 IEEE Computer Society Conference on Computer Vision and Pattern Recognition, pp. 511-518, (2001), can be used. The detection unit 302 outputs a face image that includes a detected face.

The feature value calculation unit 303 extracts a feature value of an image by inputting image data to a convolutional neural network. In the present embodiment, the feature value calculation unit 303 calculates a feature value (for example, a feature vector) from the face image acquired from the detection unit 302. For the purpose of face authentication, a feature vector expressing the difference between individuals can be calculated as a feature vector. In the present embodiment, the feature value calculation unit 303 performs this processing using the CNN. Specific processing will be described later in detail with reference to FIG. 1.

The storage unit 304 stores in advance feature values of registered images. In the present embodiment, the storage unit 304 stores feature values of registered persons (for example, a feature vector, hereinafter referred to as a registered feature vector). A registered person is a person to be identified using the face authentication system, and is decided in advance. A feature vector of a face image of a registered person (hereinafter referred to as a registered image) is calculated in advance and stored in the storage unit 304 as a registered feature vector. The storage unit 304 can store a registered feature vector, and for example, when there is a plurality of registered images, the storage unit 304 can store a registered feature vector corresponding to each registered image.

The similarity calculation unit 305 and the processing unit 306 identify an image input to the CNN based on a feature value extracted by the feature value calculation unit 303. The specific method of identification is not particularly limited, and, for example, a discriminator for providing an identification result corresponding to an input feature value may be used, or an extracted feature value may be compared with the feature value of an already identified image. In the present embodiment, the identification of an image is performed based on a comparison between a feature value extracted by the feature value calculation unit 303 and a feature value of an image for which identification has been performed in advance. For example, the similarity calculation unit 305 can calculate the similarity between an image input to the CNN and an image stored in advance based on a comparison between a feature value extracted by the feature value calculation unit 303 and a feature value of an image stored in advance in the storage unit 304. Then, the processing unit 306 can identify the image input to the CNN based on the similarity.

Figure 1:
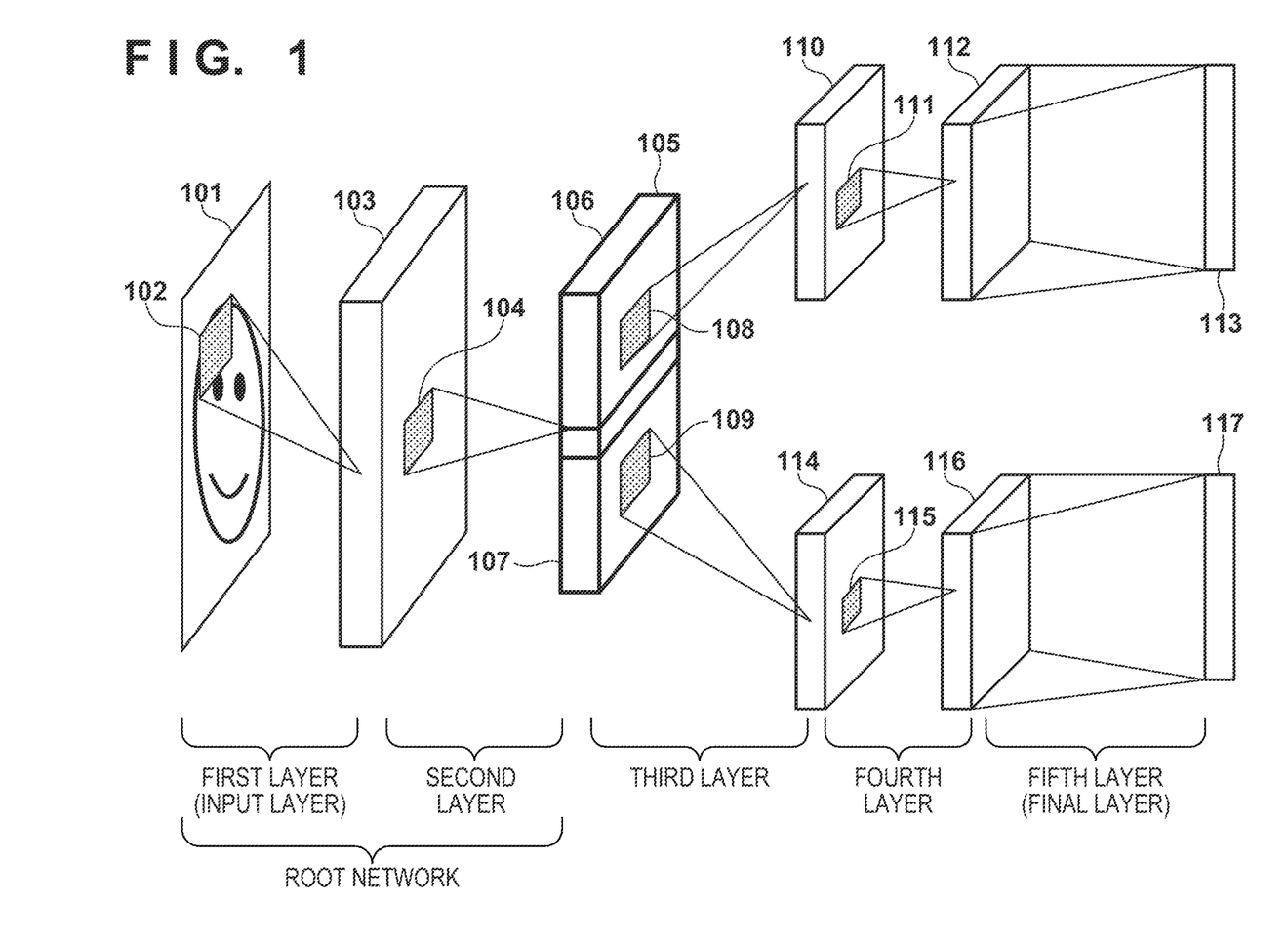
FIG. 1 is a diagram illustrating an example of a configuration of a CNN according to an embodiment.

In the present embodiment, the similarity calculation unit 305 calculates the similarity between a feature value (feature vector) calculated by the feature value calculation unit 303 from a face image and a feature value (registered feature vector) of a registered person. When the feature value calculation unit 303 has calculated a plurality of feature vectors, the similarity calculation unit 305 can combine a plurality of feature vectors when calculating similarity. For example, in the present embodiment, the feature value calculation unit 303 calculates a feature vector for each sub-region (that is, a feature vector 113 for a sub-region 106 and a feature vector 117 for a sub-region 107). In this case, the similarity calculation unit 305 can generate a single feature vector by concatenating a plurality of feature vectors calculated for each sub-region. Then, the similarity calculation unit 305 calculates the similarity between the feature vector thus created and the registered feature vector (stored in the storage unit 304) calculated from the registered image.

A method of calculating similarity is not particularly limited, but in the present embodiment, the similarity calculation unit 305 calculates the reciprocal of an L2 distance (a Euclidean distance) between the feature vector and the registered feature vector. When a plurality of registered feature vectors are stored in the storage unit 304, the similarity calculation unit 305 calculates the similarity between each registered feature vector and the feature vector calculated from the face image. In this case, the same number of similarities as the number of registered feature vectors are output.

The processing unit 306 compares a similarity calculated by the similarity calculation unit 305 with a preset threshold value, and outputs an authentication result based on a result of the comparison. For example, when the similarity between a feature vector calculated by the feature value calculation unit 303 and a registered feature vector of a registered image is larger than a predetermined threshold value, it is determined that the facial image inputted to the feature value calculation unit 303 has the same ID as the registered image. In this case, the processing unit 306 can output the ID of the registered image (or registered feature vector) as the face recognition result. When a plurality of similarities are acquired from the similarity calculation unit 305, the processing unit 306 can compare the largest similarity with the threshold value, and similarly output an authentication result. When there is no registered feature vector having a similarity exceeding the threshold value, the processing unit 306 can output an authentication result indicating that there is no registered person in the input image.

The combination of the feature value calculation unit 303, the similarity calculation unit 305, and the processing unit 306 described above can operate as an image identification apparatus according to an embodiment of the present invention. That is, the feature value calculation unit 303 extracts the feature value of an image using the CNN described above, and the similarity calculation unit 305 and the processing unit 306 identify the image based on the extracted feature value. In addition, the image identification method according to the embodiment of the present invention can be realized by extracting a feature value of an image using the CNN described above, and identifying the image based on the extracted feature value.

Next, the feature value calculation unit 303 will be described. In the present embodiment as described above, the feature value calculation unit 303 performs this processing using the CNN. As described with reference to FIG. 3, in the present embodiment, a face image is extracted by performing face detection processing on an input image that is the target of face authentication processing. The face image is input to the CNN. Accordingly, in various face images input to the CNN, positions of organs included in the face, such as the eyes, nose, or mouth, are approximately the same.

FIG. 1 illustrates an example of a configuration of a CNN according to the present embodiment. A convolution filtering process is performed on an inputted face image (an image 101) by applying the convolution filter calculation filter kernel 102. Thus, a feature plane 103 is obtained as the output of the first layer (input layer). Generally, in the CNN, a plurality of feature planes are obtained by applying each of a plurality of filter kernels 102 to the image 101. In FIG. 1, the feature plane 103 is represented by a three-dimensional shape in which a plurality of feature planes are stacked.

The feature plane 103, which is the output of the first layer (input layer), is an input reference plane to be input to the second layer. That is, the output feature plane of a previous layer (a lower layer) becomes the input reference plane of the next layer (an upper layer), whereby a hierarchical calculation is realized. Hereinafter, when expressing a relative positional relationship between layers, a layer closer to the input layer will be referred to as a lower layer, and a layer further from the input layer will be referred to as an upper layer. That is, calculation processing proceeds in an order from the lower layer to the upper layer.

Generally, in the CNN, a result obtained by adding convolution filter calculation results obtained from a plurality of reference planes, performing nonlinear conversion on a result of the addition, and further performing pooling (thinning processing) becomes a feature plane of the next layer. Such processing is not explicitly shown in FIG. 1 for the sake of brevity, and is not explained in detail in the present specification. However, in the present embodiment, it is assumed that, in order to obtain an output feature plane from the input reference planes of each layer, such processing is performed.

A convolution filtering process is performed by applying the convolution filter calculation filter kernel 104 to the feature plane 103 obtained in this way. Thus, a feature plane 105 is obtained as the output of the second layer. In FIG. 1, the root network is a network that uses the image 101 as an input and outputs a feature plane 105 of the second layer. In FIG. 1, the feature plane 105 of the second layer is a branching plane.

In one embodiment, the output of the calculation layer of the specific layer (that is, the feature plane 105 that is a branching plane) is represented as data having a three-dimensional structure. A sub-neural network is input with data within a limited range in at least one dimensional direction of the three-dimensional structure, from among the outputs of the calculation layers of the specific layer.

In addition, in one embodiment, a sub-neural network can be inputted with data (e.g., the sub-region 106 or 107 of the feature plane 105) that is within a limited range with respect to an image region from out of the output of the calculation layer of the specific layer.

In FIG. 1, as a specific example, the sub-regions 106 and 107 for the feature plane 105 of the second layer are illustrated, each sub-region being represented by thick lines. The sub-region 106 is a sub-region on the upper side of the feature plane 105, and the sub-region 107 is a sub-region on the lower side of the feature plane 105. As shown in FIG. 1, a plurality of sub-regions, e.g., the sub-regions 106 and 107, may include overlapping regions. In the following description, a network that performs subsequent calculations using only the sub-region 106 as a reference plane is referred to as a first sub-network, and a network that performs subsequent calculations using only the sub-region 107 as a reference plane is referred to as a second sub-network. The first sub-network corresponds to a first sub-neural network of the plurality of sub-neural networks, and the second sub-network corresponds to a second sub-neural network of the plurality of sub-neural networks.

The first sub-network is input with data (data of the sub-region 106 in the example of FIG. 1) corresponding to the first region of the image (for example, the upper side of the image 101), from out of the output of the calculation layer of the specific layer. In other words, a convolution filtering process is performed by applying the convolution filter calculation filter kernel 108 to the sub-region 106. Thus, a feature plane 110 is obtained as the output of the third layer of the first sub-network. Similarly, a convolution filtering process is performed by applying the convolution filter calculation filter kernel 111 to the feature plane 110. Thus, a feature plane 112 is obtained as the output of the fourth layer of the first sub-network. Finally, the feature vector 113 output from the first sub-network is obtained by performing a fully-connected calculation on the feature plane 112.

Similarly, the second sub-network is input with data (data of the sub-region 107 in the example of FIG. 1) corresponding to the second region of the image (for example, the lower side of the image 101), from the output of the calculation layer of the specific layer. That is, by applying a filter kernel 109 to the sub-region 107, convolution filtering processing is performed, and a feature plane 114 is obtained as the output of the third layer of the second sub-network. That is, by applying a filter kernel 115 to the feature plane 114, convolution filtering processing is performed, and a feature plane 116 is obtained as the output of the fourth layer of the second sub-network. Finally, the feature vector 117 output from the second sub-network is obtained by performing a fully-connected calculation on the feature plane 116.

By using the CNN having the above-described configuration, a feature vector representing a feature on the upper side of the image 101 (for example, a feature around an eye) can be obtained from the first sub-network. A feature vector representing a feature on the lower side of the image 101 (for example, a feature around a mouth) can be obtained from the second sub-network. As described above, the sub-region 106 (data corresponding to the first region of the image) and the sub-region 107 (data corresponding to the second region of the image) may partially overlap with each other in the feature plane 105 which is the branching plane. The first region and the second region of the image may partially overlap. In contrast, as a different example, the sub-region 106 (data corresponding to the first region of the image) may include the sub-region 107 (data corresponding to the second region of the image) in the feature plane which is the branching plane. The first region of the image may include the second region.

In the present embodiment, the same processing is performed on the upper side and the lower side of the image 101 until a branching plane (the feature plane 105 output from the second layer) is obtained from the image 101. That is, in the root network, the same processing is applied to the entire image 101. In contrast, different processing is applied to each sub-region using different sub-networks.

In general, it is known that in hierarchical processing in a deep network, low-order visual features (edges, and the like) are extracted in a layer close to an input, and semantic features specialized to a data set are extracted closer to an output layer. In the present embodiment, the input image 101 is a face image, and a low-order feature value such as an edge is extracted from the face image in the root network (first to second layers) near the input layer. This low-order feature value can be extracted using the same processing regardless of a position (region) in the face image. In contrast, in a sub-network, a feature value for each sub-region is calculated using a combination of low-order feature values extracted in the root network. For example, the first sub-network, which uses the upper side of the branching plane as an input, extracts a feature on the upper side of the face (e.g., a feature around an eye) using a low-order feature value. Similarly, the second sub-network, which uses the lower side of the branching plane as an input, extracts a feature on the lower side of the face (e.g., a feature around a mouth) using a low-order feature value. Since the upper side and the lower side of the face are different in appearance, it is considered that a technique suitable for calculating a feature value on the upper side of the face is different to a technique suitable for calculating a feature value on the lower side of the face. In the present embodiment, by dividing the upper layers (third layer to fifth layer) for calculating the higher-order feature value by region, a feature value suitable for identification can be extracted for each region.

Next, calculation resources and processing time required when using the CNN in the present embodiment will be described. The calculation resources refer to the amount of memory required for calculation, which is closely related to the number of parameters (in particular, a number of filter kernels used in a convolution filter calculation, and a number of coupling coefficients used in the fully-connected layer). Further, the processing time is closely related to the required calculation amount (specifically, a number of product-sum calculations).

As described in detail above, in the present embodiment, the processing using the root network of the CNN is commonly performed for each sub-region prior to the processing that uses a plurality of sub-networks. Therefore, the number of parameters required for a calculation using a sub-network increases in proportion to the number of sub-regions (the number of sub-networks), but the number of parameters required for a calculation using the root network is constant regardless of the number of sub-regions. Therefore, even if the number of sub-regions increases, it is possible to suppress an increase in the number of parameters of the CNN as a whole.

When processing is performed using a CNN for each sub-region, an increase in an amount of calculation when the number of sub-regions increases is decided according to the size of overlapping regions between the plurality of sub-regions set in the branching plane. However, in the present embodiment, the larger the overlap region, the larger the calculation amount for the sub-network becomes, but the calculation amount in the root network is constant. In this manner, as compared with the case where an independent CNN is used for each sub-region of the input image, by using the combination of a root network and sub-networks as in the present embodiment, it is possible to suppress an increase in the calculation amount of the CNN as a whole.

Figure 2A:
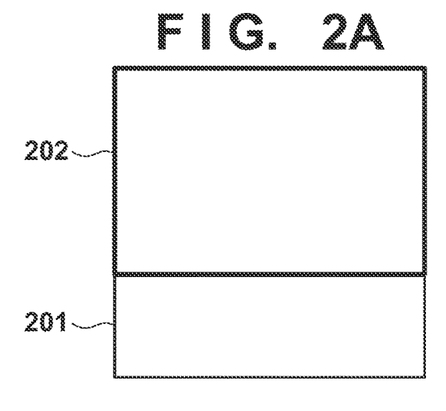
FIGS. 2A to 2E are views for describing a method of setting a sub-region in a branching plane according to an embodiment.
Figure 2B:
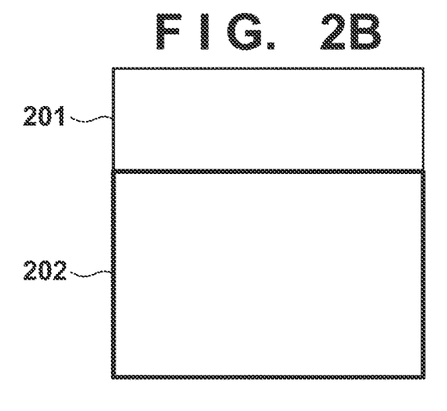
Figure 2C:
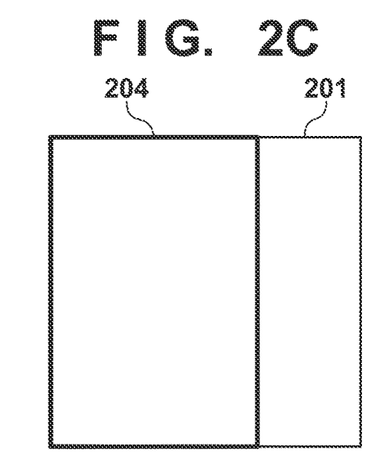
Figure 2D:
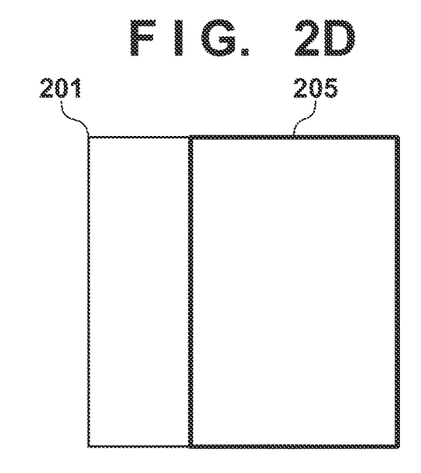
Figure 2E:
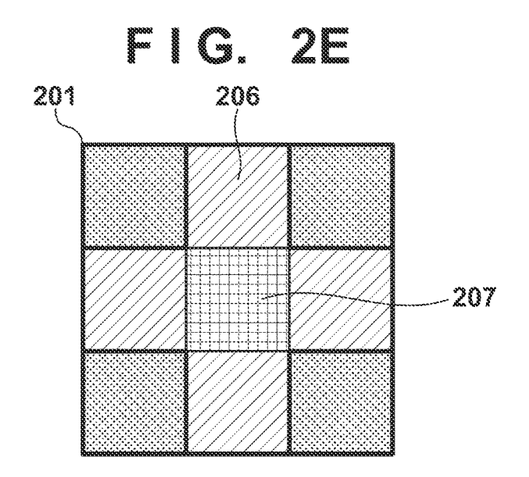

FIG. 1 shows an example of two sub-regions 106 and 107 having a small overlapping region, but the method of setting sub-regions is not limited to this. For example, FIGS. 2A to 2E show other examples of how to set sub-regions on a branching plane. FIGS. 2A to 2E show the positions of sub-regions 202 to 205 that are set on a branching plane 201. The sub-regions 202 to 205 are sub-regions on the upper side, the lower side, the left side, and the right side of the branching plane 201, respectively. In FIG. 2E, the sub-regions 202 to 205 are overlapped, and a region 206 which is hatched by diagonal lines represents a region in which three sub-regions overlap, and a region 207 which is hatched by a lattice pattern represents a region in which four sub-regions overlap. In FIGS. 2A to 2E, dimensional direction of the number of planes is not illustrated. That is, although the feature plane 105 is represented as a three-dimensional shape in FIG. 1, the branching plane 201 is represented as a plane in FIGS. 2A to 2E for the sake of simplicity.

When sub-regions are set as shown in FIGS. 2A to 2E, the ratio of the size of overlapping regions to the size of the branching plane increases. However, even in such a case, the calculation amount for the root network is smaller, by the area of the overlap region, than the calculation amount necessary to obtain a feature plane for each sub-region corresponding to the layer of the branching plane. Therefore, even if the number of sub-regions increases, it is possible to suppress an increase in a calculation amount of the CNN as a whole.

As described above in detail, according to the configuration of the present embodiment, even if there are a plurality of cut-out regions (sub-regions), it is possible to reduce the calculation resources or the processing time required in feature vector calculation processing that uses a CNN.

Thus it is possible to improve recognition performance by performing feature vector extraction processing suitable for each of the plurality of cut-out regions in accordance with the type of object to be recognized. For example, in face recognition processing, as described previously with reference to FIG. 1, by setting a cut-out region according to the position of an organ such as an eye, a nose, or a mouth, it is possible to obtain a first advantage that it is possible to extract a feature vector that enables a feature of the organ to be expressed well. Apart from this, it is also possible to achieve a second advantage that it is possible to realize face authentication which is robust (less susceptible to occlusion) with respect to face occlusion. Generally, an orientation of a face in an image is not constant, and depending on the orientation of the face, one side of the face may be hidden. Even in such a case, it can be expected that a feature vector of a non-hidden region will be good at expressing a feature of this region, when using a method of extracting a feature vector for each cut-out region. For example, when an occlusion region of a face is specified by detecting the direction of the face or the like, similarity calculation and face recognition can be performed using only the feature vector extracted from the non-hidden region. In this manner, face authentication that is robust against occlusion can be realized.

As another advantage, when a network configured as in the present embodiment is used, a plurality of sub-neural networks can be configured so that processing can be performed independently without exchanging calculation results with each other in an intermediate layer. That is, a calculation result using the sub-network for a certain sub-region is not used for a calculation using the sub-network for another sub-region. As described above, since calculations using respective sub-networks can be performed independently of each other, processing time can be shortened by parallel processing.

Second Embodiment

Figure 4:
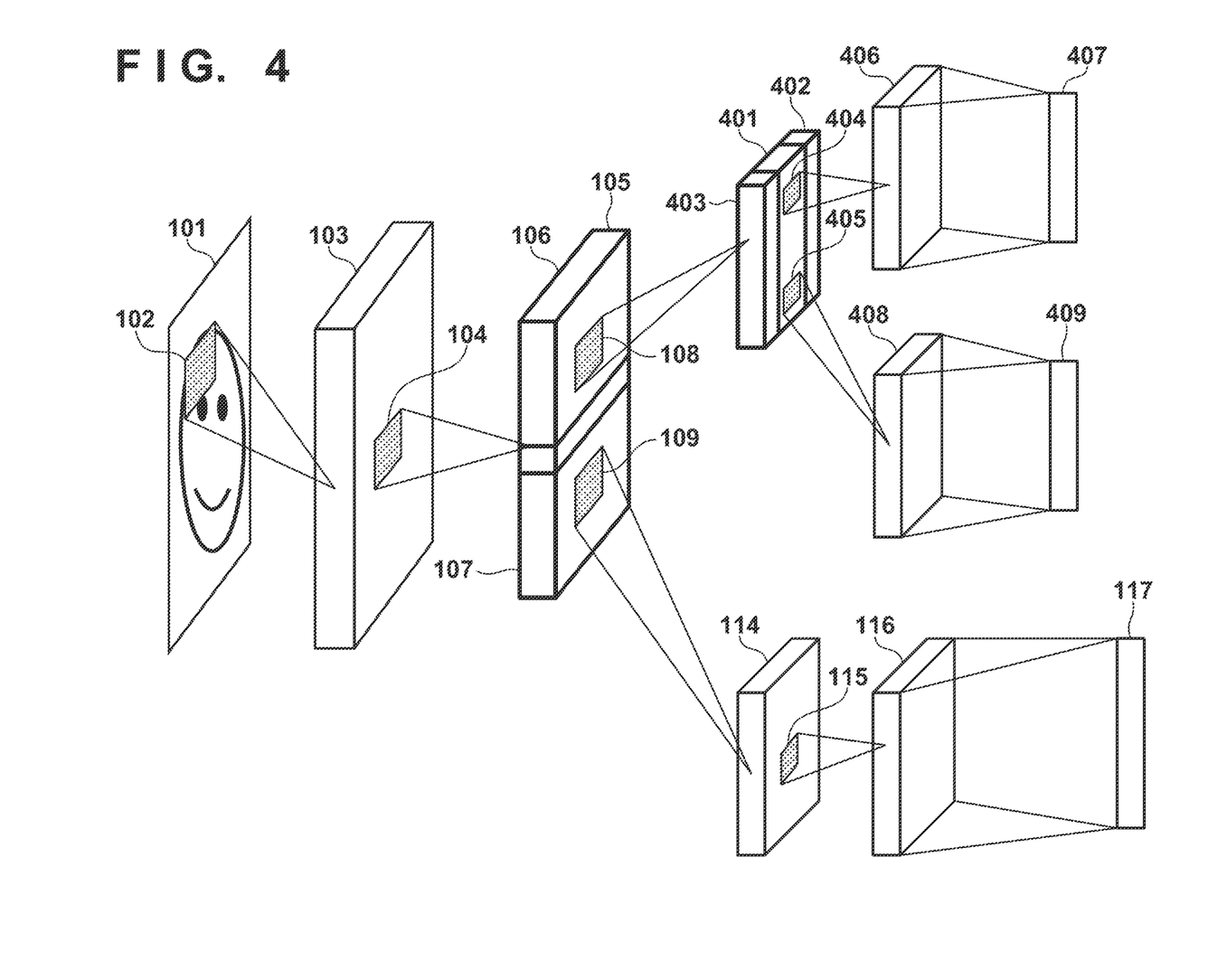
FIG. 4 is a diagram illustrating an example of a configuration of a CNN according to an embodiment.

The network according to the first embodiment has one branching plane, and beyond this branching plane is divided into a plurality of sub-networks. The network according to the second embodiment has a plurality of branching planes, and beyond each branching plane is divided into sub-networks. That is, at least one sub-neural network (first sub-network) has a first portion for performing processing by using a part (the sub-region 106) of the output of the calculation layer of the specific layer as an input. The first sub-network further includes a second portion and a third portion for performing processing using, as input, data that is from out of the output (a feature plane 401) of the first portion and that is different from each other (sub-regions 402 and 403).

FIG. 4 is a configuration diagram of an example of the CNN according to the second embodiment. In FIG. 4, the same reference numerals are added to parts similar to those in FIG. 1, and description thereof is omitted. The feature plane 401 is the output of the third layer of the first sub-network described in the first embodiment, and is similar to the feature plane 110. In the present embodiment, the feature plane 401 is also a branching plane. In the feature plane 401, a right sub-region 402 and a left sub-region 403 are set (each sub-region is represented by thick lines in the figure). In the example of FIG. 4, the sub-region 402 and the sub-region 403 partially overlap with each other. In the following description, a network that performs subsequent calculations using only the sub-region 402 as a reference plane is referred to as a first-first sub-network, and a network that performs subsequent calculations using only the sub-region 403 as a reference plane is referred to as a first-second sub-network.

Subsequently, similarly to in the first embodiment, by applying a convolution filter calculation filter kernel 404 to the sub-region 402, a feature plane 406 is obtained as the output of the fourth layer. Furthermore, the feature vector 407 output from the first-first sub-network is obtained by performing a fully-connected calculation on the feature plane 406. Furthermore, by applying a convolution filter calculation filter kernel 405 to the sub-region 403, a feature plane 408 is obtained as the output of the fourth layer. Furthermore, the feature vector 409 output from the first-second sub-network is obtained by performing a fully-connected calculation on the feature plane 408.

The configuration of the CNN according to the present embodiment has been described above. In the first embodiment, by setting only the feature plane 105 which is the output of the second layer as a branching plane and setting three sub-regions in the feature plane 105, it is also possible to obtain feature vectors for the three sub-regions similarly to the present embodiment. In contrast, in the present embodiment, processing for the first-first sub-network and the first-second sub-network can be shared up to the third layer. Therefore, it is possible to further suppress an increase in calculation resources or processing time.

Third Embodiment

In the first and second embodiments, description was given for a configuration in which a recognition process is performed using CNN parameters (e.g., a convolution filter calculation filter kernel or a coupling coefficient of a fully-connected layer) obtained by training. In the third embodiment, a training apparatus and a method of training for parameters of a CNN according to each embodiment will be described.

Training of parameters can generally be performed by the following procedure. First, a cost function for calculating a cost from a feature vector is defined. Subsequently, training data (for example, an image for which an identification result has already been obtained) is input to the CNN, and a feature vector output from the CNN is input to the cost function, thereby calculating a cost. By adjusting the parameters so as to reduce the cost calculated in this way, training of the parameters proceeds.

The cost may represent a penalty for face authentication failure. For example, the cost function can be designed such that the cost is low if a desired feature vector is output, and the cost is high if the desired feature vector is not output. In the face authentication example, the distance between feature vectors obtained from two face images can be used to determine whether the two face images are of the same person. In such a case, it is desirable that feature vectors obtained for different face images of the same person are similar. That is, it is desirable that feature vectors of face images of the same person fall within the range of a hypersphere having a certain radius. Therefore, it is possible to design a cost function that outputs a small cost when feature vectors of face images for the same person fall within the range of the hypersphere, and outputs a large cost when the feature vectors do not fall within the range of the hypersphere. At the same time, it is desirable that the distance between feature vectors of face images of different persons is larger than this radius. Therefore, in contrast to the case of the same person, it is possible to design a cost function that outputs a large cost when feature vectors of face images for strangers fall within a range of a hypersphere, and outputs a small cost when the feature vectors do not fall within the range of the hypersphere.

When feature vectors calculated for a large number of prepared training images are input to a cost function designed in this way, it is possible to optimize the parameters so that a cost that is as small as possible is output. Low cost means fewer face authentication failures for the training images. In this way, the parameters can be optimized. As a specific technique of optimization, for example, back propagation is known.

When such a method is applied to the first and second embodiments, it is possible to train the parameters of the convolutional neural network so as to reduce the cost calculated based on the output from each of the plurality of sub-neural networks. For example, the parameters of the convolutional neural network can be obtained by performing training so as to reduce the cost calculated based on a result of combining the outputs from the plurality of sub-neural networks. The training apparatus according to the embodiment includes a training unit for performing such processing.

A method of applying the training technique as described above to the training of the CNN according to the first embodiment will be described. In the example of FIG. 1, two feature vectors 113 and 117 are output from the CNN. By concatenating these two feature vectors to generate a single feature vector and inputting it to the above-mentioned cost function, the cost can be obtained in a similar manner. In this way, the parameters can be optimized (trained).

As an alternate method, a combined cost can be obtained by combining a cost calculated for each sub-neural network. For example, a cost function can be defined for each of the two feature vector, and the total cost can be obtained by combining the costs output from each of the two cost functions. Then, by performing training so as to reduce the total cost obtained in this manner, optimized parameters can be obtained. As a method of calculating the total cost, for example, a method of performing weighted addition of costs calculated for each sub-neural network using a weight set for each sub-neural network can be used.

The calculation of the total cost can also be performed in consideration of the importance of a sub-region. For example, in the case of face authentication, there is a finding that information obtained from the periphery of an eye is more useful for authentication than information obtained from the periphery of a mouth. By reflecting this knowledge to a cost calculation, it is expected that a CNN with higher accuracy can be realized. For this purpose, the cost function can be designed such that a cost calculated from the feature vector 113 which is extracted from an eye region is emphasized over a cost calculated from the feature vector 117 which is extracted from a mouth region. That is, in the weighted addition at the time of calculating the total cost, the weight for the cost calculated from the feature vector 113 can be made heavier than the weight for the cost calculated from the feature vector 117. When the cost function is designed in this manner, the parameters of the network (first sub-network) for calculating the feature vector 113 which is extracted from an eye region greatly affect the overall cost. Therefore, in the optimization of the parameters, it is expected that optimization predominantly proceeds for the parameters of the first sub-network. As a result, it is expected that the feature expression capability of a feature vector extracted from the periphery of an eye improves, and the accuracy of face authentication improves.

As described above, by investigating in advance the importance each sub-region exerts on authentication accuracy, and designing a cost function that reflects these importances, it is possible to improve authentication accuracy. As an example, letting W(i) is the importance set for the sub-region i, and C(i) is the cost for the sub-region i, the cost function can be designed to give a value obtained by adding C(i)×W(i) across all sub-regions as the overall cost.

Furthermore, the weight for each sub-neural network described above can be decided by training. That is, by using a configuration in which the importance of each sub-region (for example, the weight W(i) described above) used when calculating the total cost is obtained by training, the importance of a sub-region can be automatically considered by training. At a time of face authentication, it is also possible to weight a similarity obtained for each sub-region by using a weight obtained by training, and it is expected that the accuracy of face authentication is further improved by such a method.

Other Embodiments

In the above embodiments, the plurality of sub-neural networks have the same layered structure of calculation layers as each other. That is, the sub-networks after a certain branching plane have the same network structure as each other. For example, in FIG. 1, the first and second sub-networks have the same structure, specifically, the number of layers of the network and the number of feature planes of each layer are the same. In contrast, as a result of training, the calculation parameters of respective calculation layers are different from each other in the first and second sub-networks, and therefore, it is possible to perform feature extraction suitable for each sub-region. However, the present invention is not limited to such a configuration, and a plurality of sub-neural networks may have layered structures of mutually different calculation layers. That is, the sub-networks after the branching plane may have different configurations.

Figure 5:
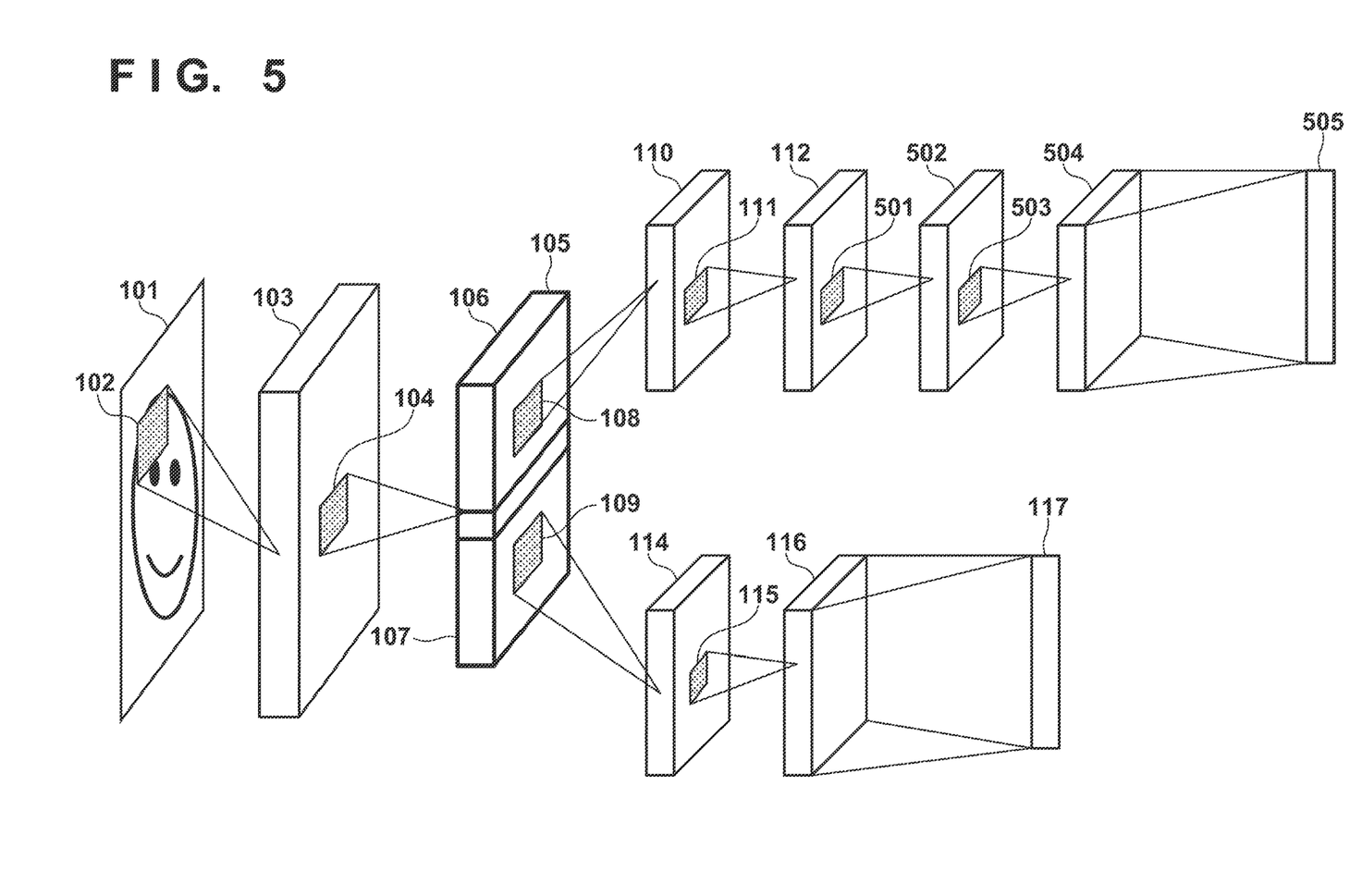
FIG. 5 is a diagram illustrating an example of a configuration of a CNN according to an embodiment.

FIG. 5 shows an example in which structures of sub-networks after the branching plane are different from each other. In FIG. 5, the same reference numerals are added to parts similar to those in FIG. 1, and description thereof is omitted. In FIG. 5, the sub-regions 106 and 107 are set in the feature plane 105 (branching plane) which is the output of the second layer. Networks for performing subsequent calculations using only the sub-regions 106 and 107 as reference planes are referred to as first and second sub-networks. Here, in the second sub-network, the feature vector 117 is obtained through the feature planes 114 and 116 in the same manner as in FIG. 1. On the other hand, in the first sub-network, a feature plane 502 is obtained by applying a convolution filter calculation filter kernel 501 to the feature plane 112. In addition, a feature plane 504 is obtained by applying a convolution filter calculation filter kernel 503 to the feature plane 502. Then, a feature vector 505 is obtained by performing a fully-connected calculation on the feature plane 504. Thus, in the first sub-network, the feature vector 505 output from the first sub-network is obtained via the feature planes 110, 112, 502, and 504.

In this manner, by changing the network structure (for example, the number of layers of the network or the number of feature planes of each layer) for each sub-region, it is possible to perform feature extraction suitable for each sub-region. As described above, in layer processing in a deep network, it is known that, as layer processing is performed, there is transition from extracting lower-order visual features (an edge or the like) to extracting higher-order semantic features. Therefore, for example, by adjusting the number of layers of the network for each sub-region, it is possible to extract a feature vector having an abstraction level suitable for each sub-region. In the case of FIG. 5, since the number of layers of the first sub-network is larger than that of the second sub-network, a feature vector having higher-order information can be extracted from the first sub-network.

Figure 6:
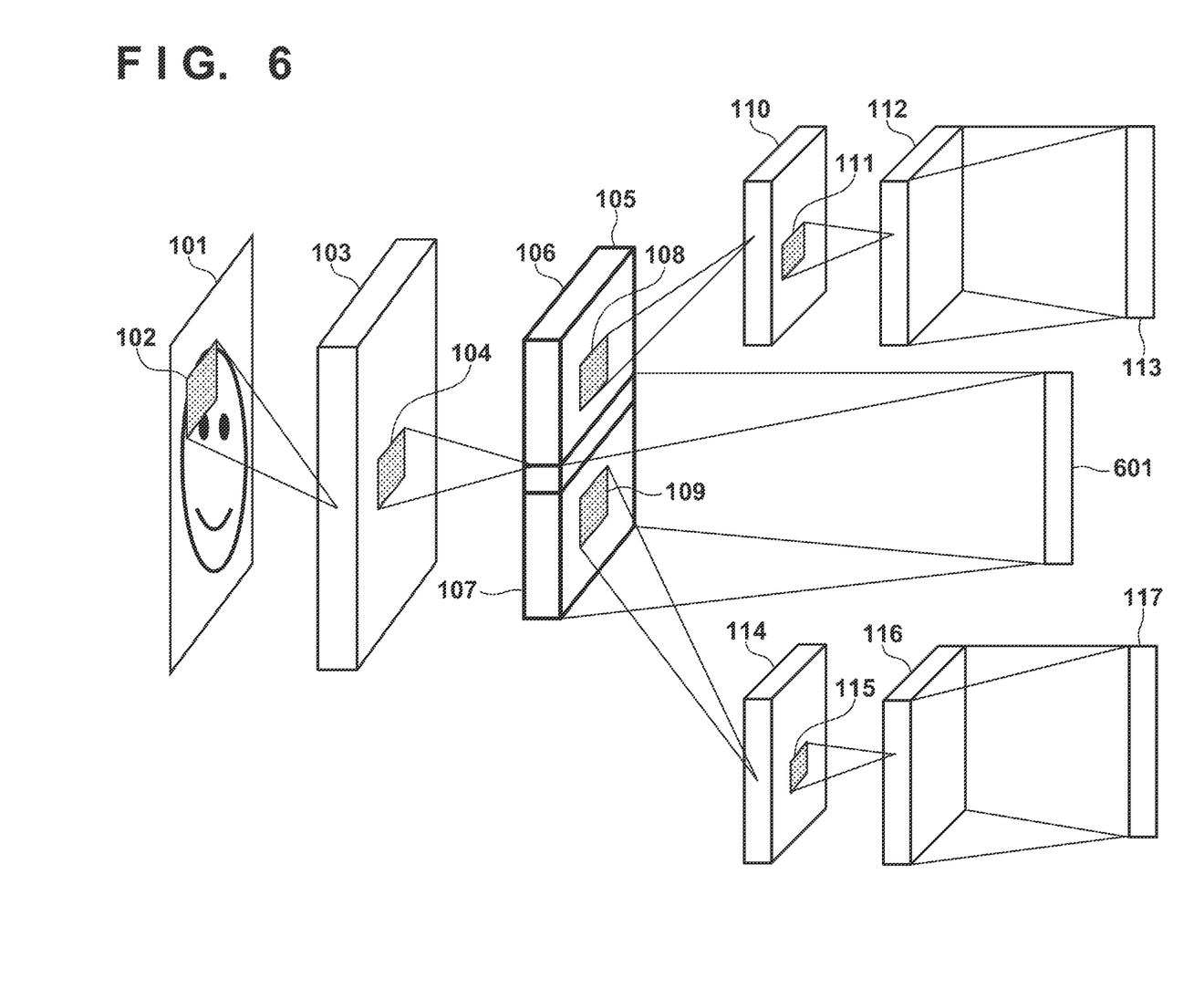
FIG. 6 is a diagram illustrating an example of a configuration of a CNN according to an embodiment.

Features having different levels of abstraction can also be extracted from the same sub-region (or sub-network). Such an example is shown in FIG. 6. In FIG. 6, the same reference numerals are added to parts similar to those in FIG. 1, and description thereof is omitted. In the example shown in FIG. 6, there is shown a feature vector 601 obtained by performing a fully-connected calculation on the sub-region 107 which is a part of the feature plane 105 (branching plane) which is an output of the second layer. The feature vectors 601 and 117 are feature vectors obtained from the sub-region 107, both of which are intermediate feature planes, but the level of abstraction of information possessed by these feature vectors is considered to be different. In this manner, by obtaining feature vectors having different abstraction levels from the same region, the accuracy of image recognition can be improved. For example, in the case of face authentication, the presence or absence of wrinkles on a face can be recognized by low-order information such as edges, and a shape feature of a mouth can be recognized by high-order information. Thus, by extracting multiple features, authentication performance is expected to improve.

Figure 7:
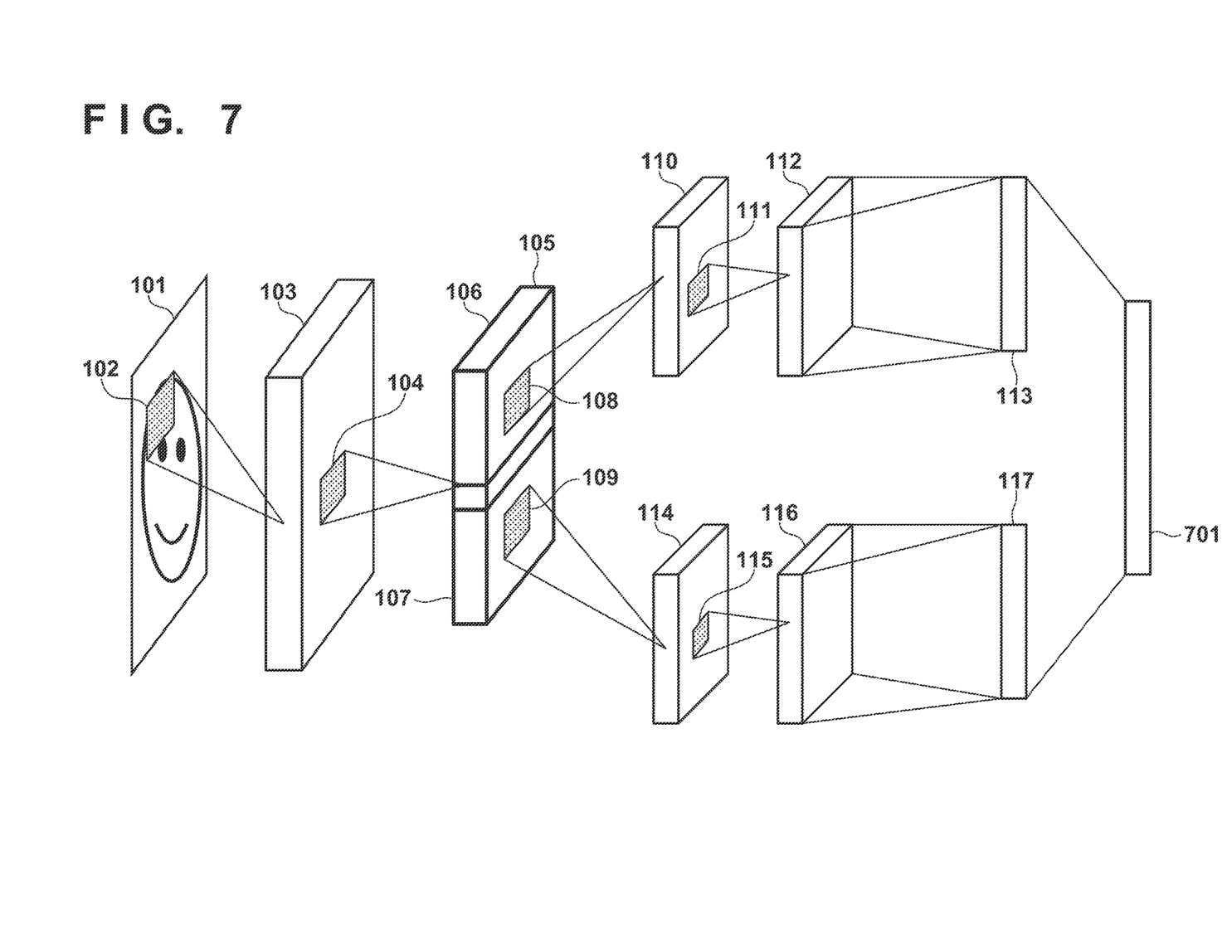
FIG. 7 is a diagram illustrating an example of a configuration of a CNN according to an embodiment.

As previously described, a feature vector output from a plurality of sub-networks can be combined to calculate a final feature vector. That is, in the first embodiment, a vector obtained by concatenating the feature vectors 113 and 117 is used as a final feature vector, and the similarity calculation unit 305 calculates the similarity between the final feature vector and a registered feature vector. However, a final feature vector may be calculated by further performing a fully-connected calculation on feature vectors output from a plurality of sub-networks. FIG. 7 shows a feature vector 701 obtained by performing a fully-connected calculation on a vector resulting from concatenating the feature vectors 113 and 117 output from respective sub-networks. In this example, by making the size of the feature vector 701 smaller than the vector resulting from concatenating the feature vector 113 and 117, it is possible to obtain the feature vector 701 in which redundant information or noise existing in the feature vectors 113 and 117 is reduced. In addition, by using the smaller feature vector 701, it is possible to reduce a calculation amount of the similarity calculation process and to reduce memory required to store a registered feature vector.

The CNN may have a combining calculation layer for combining outputs from a plurality of sub-neural networks. For this combining calculation layer, as described above, feature vectors output from a plurality of sub-networks may be concatenated, and a fully-connected calculation may be performed to thereby calculate a final feature vector. In the third embodiment, the parameters of the convolutional neural network can be obtained by performing training so as to reduce the cost calculated based on the output from the combining calculation layer.

The CNN according to each embodiment can be expressed as a program. For example, processing using CNN can be realized by using a program describing a calculation in each calculation layer and parameters used in each calculation that are recorded in the program or as data different from the program. Functions of each processing unit included in the information processing system and the image identification apparatus described above can also be expressed as a program. However, some or all of the functions of the CNN and the processing units may be realized by using dedicated hardware.

Figure 8:
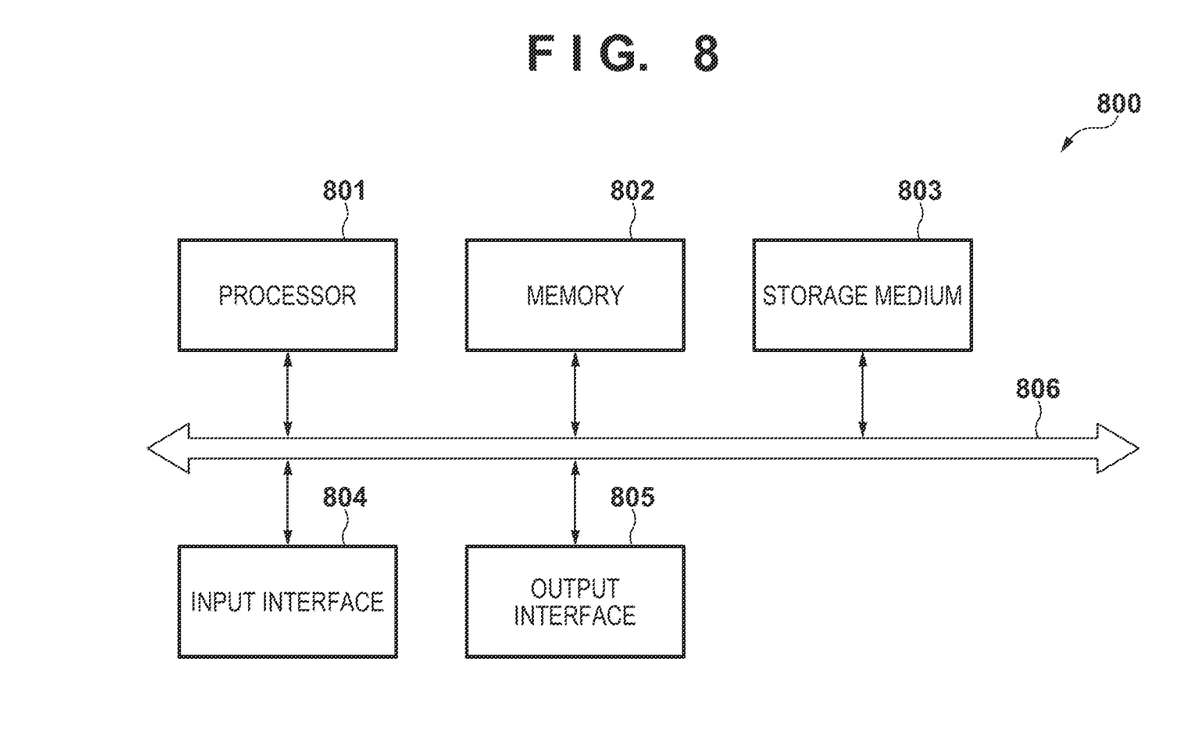
FIG. 8 is a view illustrating a functional configuration of a computer for realizing processing according to an embodiment.

Functions of the CNN or a processing unit that is expressed as a program can be realized by using an ordinary computer. FIG. 8 is a diagram showing a basic configuration of a computer. In FIG. 8, a processor 801 is, for example, a CPU, and controls operation of the entire computer. A memory 802 is, for example, a RAM, and temporarily stores programs, data, and the like. A computer-readable storage medium 803 is, for example, a hard disk, a CD-ROM, or the like, and stores programs, data, and the like over a long period of time. In the present embodiment, a program for realizing the functions of each unit, which is stored in the storage medium 803, is read out to the memory 802. Each function is realized by the processor 801 operating in accordance with a program on the memory 802. In FIG. 8, an input interface 804 is an interface for acquiring information from an external device. In addition, an output interface 805 is an interface for outputting information to an external device. The bus 806 connects the above-mentioned components and enables data exchange.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-154214, filed Aug. 20, 2018, which is hereby incorporated by reference herein in its entirety.

What is claimed is:

1. An image identification apparatus, comprising:
   at least one circuit and/or processor, the at least one circuit and/or processor being configured to function as;
   an extraction unit configured to extract a feature value of an image from image data using a Neural Network (NN); and
   a processing unit configured to identify the image based on the feature value extracted by the extraction unit,
   wherein the NN comprises a plurality of calculation layers connected hierarchically, and
   wherein the NN includes a plurality of sub-neural networks for performing processing of calculation layers after a specific calculation layer, and wherein mutually different data, each corresponding to a different sub-region of the image data, from an output of the specific calculation layer are respectively inputted to the plurality of sub-neural networks.

2. The image identification apparatus according to claim 1, wherein
   the output of the specific calculation layer is expressed as data having a three-dimensional structure, and
   each of the sub-neural networks is configured to be inputted with data, that is within a range limited in relation to at least one dimensional direction from the three-dimensional structure, from the output of the specific calculation layer.

3. The image identification apparatus according to claim 1, wherein
   the NN is configured to be inputted with image data, and
   each of the sub-neural networks is configured to be inputted with data, that is within a limited range with respect to an image region, from the output of the specific calculation layer.

4. The image identification apparatus according to claim 3, wherein
   a first sub-neural network of the plurality of sub-neural networks is inputted with data from the output of the specific calculation layer corresponding to a first region of the image,
   a second sub-neural network of the plurality of sub-neural networks is inputted with data from the output of the specific calculation layer corresponding to a second region of the image, and
   the data corresponding to the first region and the data corresponding to the second region partially overlap.

5. The image identification apparatus according to claim 1, wherein the plurality of sub-neural networks have the same hierarchical structure and different calculation parameters.

6. The image identification apparatus according to claim 1, wherein
   the plurality of sub-neural networks have different hierarchical structure with each other.

7. The image identification apparatus according to claim 1, wherein at least one of the sub-neural networks has a first portion for performing processing with a part of the output of the specific calculation layer as an input, and second and third portions for performing processing with mutually different data from an output of the first portion as inputs.

8. The image identification apparatus according to claim 1, wherein the plurality of sub-neural networks are configured so that processing can be performed independently without mutually exchanging calculation results at intermediate layers.

9. The image identification apparatus according to claim 1, further comprising a combining calculation layer configured to combine outputs from the plurality of sub-neural networks.

10. The image identification apparatus according to claim 1, wherein the at least one circuit and/or processor being further configured to function as:
    a calculation unit configured to calculate a cost of the NN; and
    a determination unit configured to determine parameters of the NN by performing training so as to reduce the cost.

11. The image identification apparatus according to claim 10, wherein the calculation unit is further configured to calculate respective sub-costs of the plurality of sub-neural networks, and to calculate the cost of the NN based on the sub-costs.

12. The image identification apparatus according to claim 11, wherein the calculation unit is further configured to calculate the cost of the NN using a weighted addition of the sub-costs with a weight for each of the plurality of sub-neural networks.

13. The image identification apparatus according to claim 12, wherein the weight for each of the plurality of sub-neural networks is determined by the training.

14. The image identification apparatus according to claim 10, wherein the calculation unit is further configured to calculate the cost of the NN based on a result of combining outputs from the plurality of sub-neural networks.

15. The image identification apparatus according to claim 1, wherein the plurality of sub-neural networks independently output respective results.

16. The image identification apparatus according to claim 1, wherein the plurality of sub-neural networks are respectively inputted with independent data and respectively outputs independent data after the specific calculation layer.

17. The image identification apparatus according to claim 1, wherein the NN comprises a single neural network before the specific calculation layer.

18. An image identification method, comprising:
    extracting a feature value of an image from image data using a Neural Network (NN); and
    identifying the image based on the extracted feature value,
    wherein the NN comprises a plurality of calculation layers connected hierarchically, and
    wherein the NN includes a plurality of sub-neural networks for performing processing of calculation layers after a specific calculation layer, and wherein mutually different data, each corresponding to a different sub-region of the image data, from an output of the specific calculation layer are respectively inputted to the plurality of sub-neural networks.

19. A training apparatus, comprising:
    at least one circuit and/or processor, the at least one circuit and/or processor being configured to function as;
    a training unit configured to train a Neural Network (NN),
    wherein the NN comprises a plurality of calculation layers connected hierarchically,
    wherein the NN includes a plurality of sub-neural networks for performing processing of calculation layers after a specific calculation layer, and wherein mutually different data, each corresponding to a different sub-region of image data, from an output of the specific calculation layer are respectively inputted to the plurality of sub-neural networks, and wherein the training unit is further configured to determine parameters of the NN by performing training so as to reduce a cost calculated based on an output from each of the plurality of sub-neural networks.

20. A neural network (NN) comprising a plurality of calculation layers connected hierarchically, wherein the NN includes a plurality of sub-neural networks for performing processing of calculation layers after a specific calculation layer, and wherein mutually different data, each corresponding to a different sub-region of image data, from an output of the specific calculation layer are respectively inputted to the plurality of sub-neural networks.

* * * * *